US009164804B2

(12) United States Patent
Floman et al.

(10) Patent No.: US 9,164,804 B2
(45) Date of Patent: Oct. 20, 2015

(54) VIRTUAL MEMORY MODULE

(75) Inventors: Matti Floman, Kangasala (FI); Kimmo Mylly, Ylojarvi (FI)

(73) Assignee: Memory Technologies LLC, Las Vegas, NV (US)

( * ) Notice: Subject to any disclaimer, the term of this patent is extended or adjusted under 35 U.S.C. 154(b) by 311 days.

(21) Appl. No.: 13/527,745

(22) Filed: Jun. 20, 2012

(65) Prior Publication Data

US 2013/0346668 A1   Dec. 26, 2013

(51) Int. Cl.
G06F 12/08 (2006.01)
G06F 9/50 (2006.01)

(52) U.S. Cl.
CPC ............ G06F 9/5016 (2013.01); *G06F 9/5005* (2013.01)

(58) Field of Classification Search
CPC .............................. G06F 9/5005; G06F 9/5016
See application file for complete search history.

(56) References Cited

U.S. PATENT DOCUMENTS

| | | |
|---|---|---|
| 5,586,291 A | 12/1996 | Lasker et al. |
| 5,701,516 A | 12/1997 | Cheng et al. |
| 5,802,069 A | 9/1998 | Coulson |
| 5,924,097 A * | 7/1999 | Hill et al. .................... 707/703 |
| 6,067,300 A | 5/2000 | Baumert et al. |
| 6,115,785 A | 9/2000 | Estakhri et al. |
| 6,373,768 B2 | 4/2002 | Woo et al. |
| 6,513,094 B1 | 1/2003 | Magro |
| 6,522,586 B2 | 2/2003 | Wong |
| 6,665,747 B1 | 12/2003 | Nazari |
| 6,842,829 B1 | 1/2005 | Nichols et al. |
| 7,136,963 B2 | 11/2006 | Ogawa et al. |
| 7,181,574 B1 | 2/2007 | Lele |
| 7,233,538 B1 | 6/2007 | Wu et al. |
| 7,321,958 B2 | 1/2008 | Hofstee et al. |
| 7,395,176 B2 | 7/2008 | Chung et al. |

(Continued)

FOREIGN PATENT DOCUMENTS

AU    2005200855 A1    9/2004
EP    0481716 A2    4/1992

(Continued)

OTHER PUBLICATIONS

Lin et al., "A NAND Flash Memory Controller for SD/MMC Flash Memory Card", IEEE Transactions of Magnetics, vol. 43, No. 2, (Feb. 2, 2007), pp. 933-935).

(Continued)

*Primary Examiner* — Cheng-Yuan Tseng
*Assistant Examiner* — Alan Otto
(74) *Attorney, Agent, or Firm* — Lee & Hayes, PLLC

(57) ABSTRACT

A memory controller of a mass memory device determining that a memory operation has been initiated which involves the mass memory device, and in response dynamically checks for available processing resources of a host device that is operatively coupled to the mass memory device and thereafter puts at least one of the available processing resources into use for performing the memory operation. In various non-limiting examples: the available processing resources may be a core engine of a multi-core CPU, a DPS or a graphics processor; central processing unit; a digital signal processor; and a graphics processor; and it may also be dynamically checked whether memory resources of the host are available and those can be similarly put into use (e.g., write data to a DRAM of the host, process data in the DRAM with the host DSP, then write the processed data to the mass memory device).

23 Claims, 6 Drawing Sheets

(56) References Cited

U.S. PATENT DOCUMENTS

| | | | |
|---|---|---|---|
| 7,450,456 | B2 | 11/2008 | Jain et al. |
| 7,480,749 | B1 | 1/2009 | Danilak |
| 7,571,295 | B2 | 8/2009 | Sakarda et al. |
| 7,760,569 | B2 | 7/2010 | Ruf et al. |
| 8,190,803 | B2 | 5/2012 | Hobson et al. |
| 8,218,137 | B2 | 7/2012 | Noh et al. |
| 2002/0093913 | A1* | 7/2002 | Brown et al. ............... 370/232 |
| 2002/0108014 | A1 | 8/2002 | Lasser ........................ 711/103 |
| 2003/0028737 | A1 | 2/2003 | Kaiya et al. |
| 2003/0137860 | A1 | 7/2003 | Khatri et al. ................. 365/63 |
| 2004/0010671 | A1 | 1/2004 | Sampsa et al. ............... 711/165 |
| 2004/0203670 | A1 | 10/2004 | King et al. |
| 2004/0221124 | A1 | 11/2004 | Beckert et al. .............. 711/202 |
| 2005/0010738 | A1 | 1/2005 | Stockdale et al. ........... 711/170 |
| 2005/0071570 | A1 | 3/2005 | Takasugl et al. |
| 2005/0097280 | A1 | 5/2005 | Hofstee et al. |
| 2006/0041888 | A1 | 2/2006 | Radulescu et al. |
| 2006/0069899 | A1 | 3/2006 | Schoinas et al. |
| 2006/0075147 | A1 | 4/2006 | Schoinas et al. |
| 2006/0075395 | A1 | 4/2006 | Lee et al. |
| 2007/0088867 | A1 | 4/2007 | Cho et al. ..................... 710/22 |
| 2007/0207854 | A1 | 9/2007 | Wolf et al. |
| 2007/0234006 | A1 | 10/2007 | Radulescu et al. |
| 2007/0283078 | A1 | 12/2007 | Li et al. ...................... 711/103 |
| 2008/0104291 | A1 | 5/2008 | Hinchey |
| 2008/0127131 | A1 | 5/2008 | Gao et al. |
| 2008/0162792 | A1 | 7/2008 | Wu et al. ..................... 711/103 |
| 2008/0228984 | A1 | 9/2008 | Yu et al. ...................... 710/308 |
| 2008/0281944 | A1 | 11/2008 | Vorne et al. |
| 2009/0106503 | A1 | 4/2009 | Lee et al. |
| 2009/0157950 | A1 | 6/2009 | Selinger |
| 2009/0164705 | A1 | 6/2009 | Gorobets |
| 2009/0182940 | A1 | 7/2009 | Matsuda et al. |
| 2009/0182962 | A1 | 7/2009 | Khmelnitsky et al. ........ 711/162 |
| 2009/0198871 | A1 | 8/2009 | Tzeng |
| 2009/0198872 | A1 | 8/2009 | Tzeng |
| 2009/0210615 | A1 | 8/2009 | Struk et al. |
| 2009/0216937 | A1 | 8/2009 | Yasufuku ..................... 711/103 |
| 2009/0222629 | A1 | 9/2009 | Yano et al. |
| 2009/0307377 | A1 | 12/2009 | Anderson et al. ................ 710/3 |
| 2009/0327584 | A1 | 12/2009 | Tetrick et al. |
| 2010/0005281 | A1 | 1/2010 | Buchmann et al. |
| 2010/0030961 | A9 | 2/2010 | Ma et al. |
| 2010/0037012 | A1 | 2/2010 | Yano et al. |
| 2010/0100648 | A1 | 4/2010 | Madukkarumukumana et al. |
| 2010/0106886 | A1 | 4/2010 | Marcu et al. .................. 711/102 |
| 2010/0106901 | A1 | 4/2010 | Higeta et al. |
| 2010/0115193 | A1 | 5/2010 | Manus et al. |
| 2010/0161882 | A1 | 6/2010 | Stern et al. |
| 2010/0169558 | A1 | 7/2010 | Honda et al. ................. 711/103 |
| 2010/0172180 | A1 | 7/2010 | Paley et al. ............... 365/185.12 |
| 2010/0250836 | A1 | 9/2010 | Sokolov et al. |
| 2010/0293420 | A1 | 11/2010 | Kapil et al. ................... 714/710 |
| 2010/0312947 | A1 | 12/2010 | Luukkainen et al. ......... 711/103 |
| 2011/0082967 | A1 | 4/2011 | Deshkar et al. |
| 2011/0087804 | A1 | 4/2011 | Okaue et al. |
| 2011/0099326 | A1 | 4/2011 | Jung et al. |
| 2011/0264860 | A1 | 10/2011 | Hooker et al. |
| 2011/0296088 | A1 | 12/2011 | Duzly et al. ................... 711/103 |
| 2012/0102268 | A1 | 4/2012 | Smith et al. |
| 2012/0131263 | A1 | 5/2012 | Yeh |
| 2012/0131269 | A1 | 5/2012 | Fisher et al. |
| 2012/0151118 | A1 | 6/2012 | Flynn et al. |
| 2012/0210326 | A1 | 8/2012 | Torr et al. |
| 2013/0138840 | A1 | 5/2013 | Kegel et al. |
| 2013/0145055 | A1 | 6/2013 | Kegel et al. |
| 2013/0339635 | A1* | 12/2013 | Amit et al. ................... 711/154 |
| 2014/0068140 | A1 | 3/2014 | Mylly |
| 2015/0039819 | A1 | 2/2015 | Luukkainen et al. |

FOREIGN PATENT DOCUMENTS

| | | | |
|---|---|---|---|
| JP | 59135563 | A | 8/1984 |
| WO | WO99/65193 | A1 | 12/1999 |
| WO | WO2004084231 | A1 | 9/2004 |
| WO | WO2005088468 | A2 | 6/2005 |

OTHER PUBLICATIONS

"How to Boot an Embedded System for an emMC Equipped with a Microsoft FAT File System", AN2539 Numonyx Application Note, Nov. 2008, pp. 1-25.

Embedded MultiMediaCard (eMMC) Mechanical Standard, JESD84-C43, JEDEC Standard, JEDEC Solid State Technology Association, Jun. 2007.

Embedded MultiMediaCard (eMMC) Product Standard, High Capacity, JEDEC Solid State Technology Association, JEDEC Standard, JES 84-A42, Jun. 2007.

Li et al, "A Method for Improving Concurrent Write Performance by Dynamic Mapping Virtual Storage System Combined with Cache Management", 2011 IEEE $7^{th}$ International Conference of Parallel Distributed System, Dec. 7-8, 2011.

The PCT Search Report and Written Opinion mailed Apr. 16, 2014 for PCT application No. PCT/US13/49434, 8 pages.

Apostolakis, et al., "Software-Based Self Testing of Symmetric Shared-Memory Multiprocessors", IEEE Transactions on Computers, vol. 58, No. 12, Dec. 2009, 13 pages.

JEDEC Standard, "Embedded MultiMediaCard (eMMC) Product Standard, High Capacity," JESD84-A42, Jun. 2007, 29 pages.

JEDEC Standard, "Embedded ZmultiMediaCard(eMMC) eMMC/Card Product Standard, high Capacity, Including Reliable Write, Boot, and Sleep Modes," (MMCA, 4.3), JSEDD84-A43, Nov. 2007, 166 pages.

JEDEC Standard, "Embedded MultiMediaCard (eMMC) Mechanical Standard," JESD84-C43, Jun. 2007, 13 pages.

Numonyz, "How to boot an embedded system from an eMMCTM equipped with a Microsoft FAT file system." Application note AN2539, Nov. 2008, pp. 1-25.

Office Action for U.S. Appl. No. 13/358,806, mailed on Nov. 27, 2013, Kimmo J. Mylly, "Apparatus and Method to Provide Cache Move With Non-Volatile Mass Memory System", 26 pages.

Office Action for U.S. Appl. No. 14/520,030, mailed on Dec. 4, 2014, Olli Luukkainen, "Apparatus and Method to Share Host System RAM with Mass Storage Memory RAM", 6 pages.

Office Action for U.S. Appl. No. 13/596,480, mailed on Mar. 13, 2014, Kimmo J. Mylly, "Dynamic Central Cache Memory", 15 pages.

Office Action for U.S. Appl. No. 12/455,763, mailed on Mar. 4, 2014, Luukkainen et al., "Apparatus and method to share host system ram with mass storage memory ram", 6 pages.

Office Action for U.S. Appl. No. 12/455,763, mailed on Aug. 1, 2013, Luukkainen et al., "Apparatus and method to share host system ram with mass storage memory ram", 28 pages.

Final Office Action for U.S. Appl. No. 13/358,806, mailed on Sep. 10, 2014, Kimmo J. Mylly, "Apparatus and Method to Provide Cache Move With Non-Volatile Mass Memory System", 27 pages.

The PCT Search Report mailed Feb. 25, 2015 for PCT application No. PCT/US2014/069616, 10 pages.

The PCT Search Report and Written Opinion mailed Mar. 6, 2014 for PCT application No. PCT/US13/56980, 11 pages.

Tanenbaum, "Structured Computer Organization", Prentice-Hall, Inc., 1984, 5 pages.

Office Action for U.S. Appl. No. 13/358,806, mailed on Apr. 30, 2015, Kimmo J. Mylly, "Apparatus and Method to Provide Cache Move With Non-Volatile Mass Memory System", 42 pages.

Final Office Action for U.S. Appl. No. 14/520,030, mailed on May 20, 2015, Olli Luukkaninen, "Apparatus and Method to Share Host System RAM with Mass Storage Memory RAM", 6 pages.

\* cited by examiner

VIRTUAL MEMORY MODULE

TECHNICAL FIELD

The exemplary and non-limiting embodiments of this invention relate generally to memory storage systems, methods, devices and computer programs and, more specifically, relate to sharing resources among mass memory devices and the host devices to which they are operatively attached.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

Various types of flash-based mass storage memories currently exist. A basic premise of managed mass storage memory is to hide the flash technology complexity from the host system. A technology such as embedded multimedia card (eMMC) is one example. A managed NAND type of memory can be, for example, an eMMC, solid state drive (SSD), universal flash storage (UFS) or a mini or micro secure digital (SD) card.

FIG. 1A reproduces FIG. 2 from JEDEC Standard, Embedded MultiMediaCard (eMMC) Product Standard, High Capacity, JESD84-A42, June 2007, JEDEC Solid State Technology Association, and shows a functional block diagram of an eMMC. The JEDEC eMMC includes, in addition to the flash memory itself, an intelligent on-board controller that manages the MMC communication protocol. The controller also handles block-management functions such as logical block allocation and wear leveling. The interface includes a clock (CLK) input. Also included is a command (CMD), which is a bidirectional command channel used for device initialization and command transfers. Commands are sent from a bus master to the device, and responses are sent from the device to the host. Also included is a bidirectional data bus (DAT[7:0]). The DAT signals operate in push-pull mode. By default, after power-up or RESET, only DAT0 is used for data transfer. The memory controller can configure a wider data bus for data transfer using either DAT[3:0] (4-bit mode) or DAT[7:0] (8- bit mode).

One non-limiting example of a flash memory controller construction is described in "A NAND Flash Memory Controller for SD/MMC Flash Memory Card", Chuan-Sheng Lin and Lan-Rong Dung, IEEE Transactions of Magnetics, Vol. 43, No. 2, February 2007, pp. 933-935 (hereafter referred to as Lin et al.) FIG. 1B reproduces FIG. 1 of Lin et al., and shows an overall block diagram of the NAND flash controller architecture for a SD/MMC card. The particular controller illustrated happens to use a w-bit parallel Bose-Chaudhuri-Hocquengham (BCH) error-correction code (ECC) designed to correct random bit errors of the flash memory, in conjunction with a code-banking mechanism.

Performance of the mass memory device, and of the host device utilizing the mass memory device, are highly dependent on the amount of resources that are available for the memory functions. Such resources have traditionally been the central processing unit (CPU), random access memory (RAM) and also non-volatile memory such as for example non-volatile execution memory type (NOR) or non-volatile mass memory type (NAND). Resource availability also affects reliability and usability of the mass memory device. Most host/mass memory systems currently in commerce utilize a fixed allocation of resources. In traditional memory arrangements the CPU has some means to connect to the RAM and to the non-volatile memory, and these memories themselves have the resources needed for their own internal operations. But since that paradigm became prevalent the variety of resources has greatly increased, for example it is now common for there to be multi-core CPUs, main/slave processors, graphics accelerators, and the like.

Co-owned U.S. patent application Ser. No. 12/455,763 (filed Jun. 4, 2009) details an example in which there is one NAND where the NAND flash translation layer (FTL, a specification by the Personal Computer Memory Card International Association PCMCIA which provides for P2L mapping table, wear leveling, etc.) occurs side by side by the main CPU. Co-owned U.S. patent application Ser. No. 13/358,806 (filed Jan. 26, 2012) details examples in which eMMC and UFS components could also use system dynamic random access memory (DRAM) for various purposes in which case the system CPU would not do any relevant memory-processing.

SUMMARY

In a first aspect thereof the exemplary embodiments of this invention provide a method that comprises: in response to determining that a memory operation has been initiated which involves a mass memory device, dynamically checking for available processing resources of a host device that is operatively coupled to the mass memory device; and putting at least one of the available processing resources into use for performing the memory operation.

In a second aspect thereof the exemplary embodiments of this invention provide an apparatus that comprises a) at least one memory controller embodied in a mass memory device; and b) an interface operatively coupling the mass memory device to a host device. In this second aspect the memory controller is configured to cause the apparatus to at least: in response to determining that a memory operation has been initiated which involves a mass memory device, dynamically checking for available processing resources of a host device that is operatively coupled to the mass memory device; and putting at least one of the available processing resources into use for performing the memory operation. In this aspect the memory controller may utilize executable software stored in the mass memory device for causing the mass memory device to behave as noted above. For example, such software that is tangibly embodied in a memory is recited below at the third aspect of these teachings.

In yet a third aspect thereof the exemplary embodiments of this invention provide a memory storing a program of computer readable instructions which when executed by a memory processor of a mass memory device causes the mass memory device to perform at least: in response to determining that a memory operation has been initiated which involves a mass memory device, dynamically checking for available processing resources of a host device that is operatively coupled to the mass memory device; and putting at least one of the available processing resources into use for performing the memory operation.

DETAILED DESCRIPTION

Embodiments of these teachings relate to architectures that are particularly advantageous for mobile host devices but can be implemented to advantage in non-mobile environments such as for example other consumer electronics such as personal computers PCs. Mass memories have evolved to include some complex logic, for purposes of wear levelling, error correction, physical-logical transformation and interface protocol handling to name a few. At the same time the amount of system RAM (typically dynamic RAM or DRAM) is very high compared to earlier mobile devices. The inventors have concluded that in general today's mobile devices have plenty of resources and not all of them are in use at the same time.

Like other prior memory systems, a common feature of the two co-owned US patent applications referenced in the background section is that the amount of resources outside of the memories is fixed. But a fixed split of resources between the host device and the mass memory device might not be optimum in all cases, for example if the same engine is used for two different end products or even in case of different use cases of one product.

Another problem with a fixed split of resources is that in some cases resources integrated to for an example mass memory are not available in a small enough amount such as in the case of DRAM, or these resources are not in effective usage. To design a mass memory module for peak performance would be costly, and would forego some of the efficiencies in manufacturing scale if different versions of a mass memory device needed to be designed for different end-products.

Embodiments of these teachings break with that paradigm of fixed divisions of the memory device and the host device so as to make system resources, which are available and suitable for memory usage, dynamically available for use with memory functions. As non-limiting examples, such resources can include system RAM (including DRAM, SRAM and other variants), CPU core or cores, digital signal processor (DSP), graphics processor, and so forth. In one particularly flexible embodiment the system and mass memory can agree about usage of the available resources and also about the manner in which the mass memory module can offer resources to the system.

In one embodiment the resources that can be made available for memory functionalities can be defined by the end user, the user of a mobile handset or PC for example. In other implementations the host system has ways to add resources to the "available" list from which those available resources can be taken into the memory usage dynamically.

Figure 2:
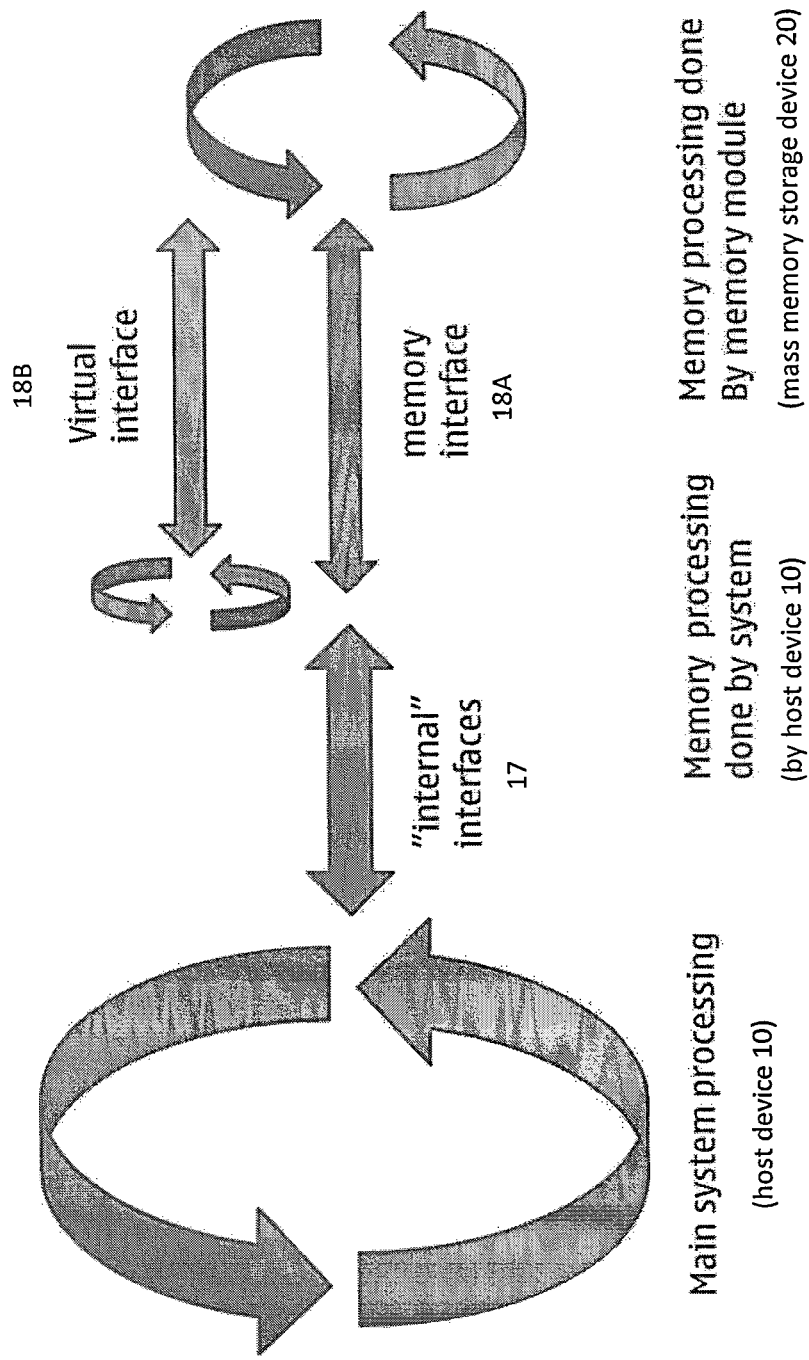
FIG. 2 is a simplified block diagram of a host device 10 connected with a mass storage memory device 20, and is helpful in describing the exemplary embodiments of this invention.

FIG. 2 is a schematic diagram illustrating interfaces among the host device 10 and the mass memory device 20. Main system processing refers to processing in the host device 10 and memory processing is done by the mass memory device 20. Memory processing done by the 'system' is processing for the mass memory device 20 which is performed by the host device 10, and this can use any available resources which are resident in either host 10 or mass memory 20 device. Internal of the host device 10 are internal interfaces 17 by which for example the CPU reads from or writes to a RAM in the host 10, and these interfaces are fully operative regardless of whether or not a mass memory device 20 is operatively attached to the host device 10. The mass memory device 20 has similar internal interfaces that are shown by example at FIG. 3. Finally at FIG. 2 between the host device 10 and the mass memory device 20 there is a conventional memory interface 18A through which data and commands are exchanged, and also a virtual interface 18B through which the host device 10 and/or the mass memory device 20 make their resources available to the opposite entity 10, 20.

In FIG. 2 the memory processing being done by the system is an optional functionality which is enabled by these teachings; in some instances resources from the host device may be dynamically selected for this memory processing while in other cases they may not be, but regardless those resources are made dynamically available depending on the processing in the mass memory which needs to be done.

Figure 1A:
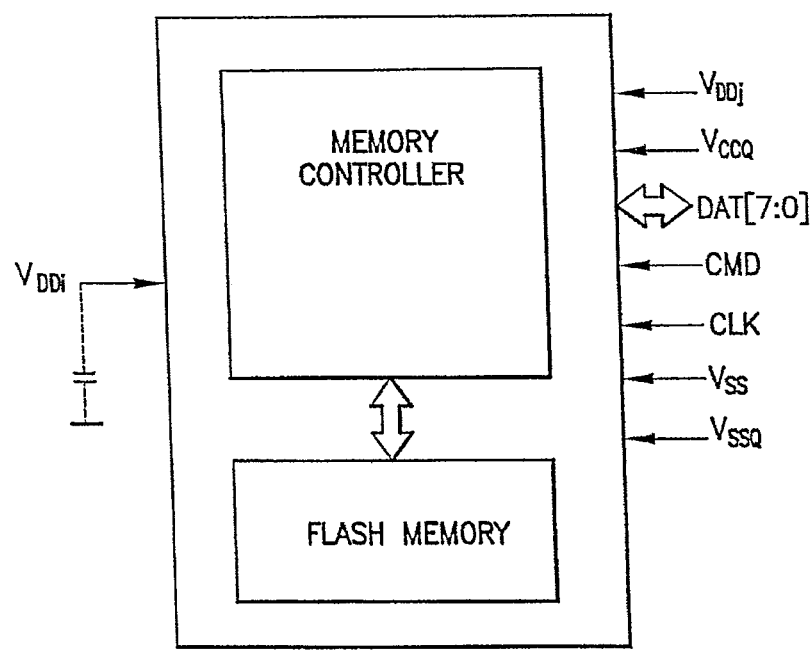
FIG. 1A reproduces FIG. 2 from JEDEC Standard, Embedded MultiMediaCard (eMMC) Product Standard, High Capacity, JESD84-A42, June 2007, JEDEC Solid State Technology Association, and shows a functional block diagram of an eMMC.
Figure 1B:
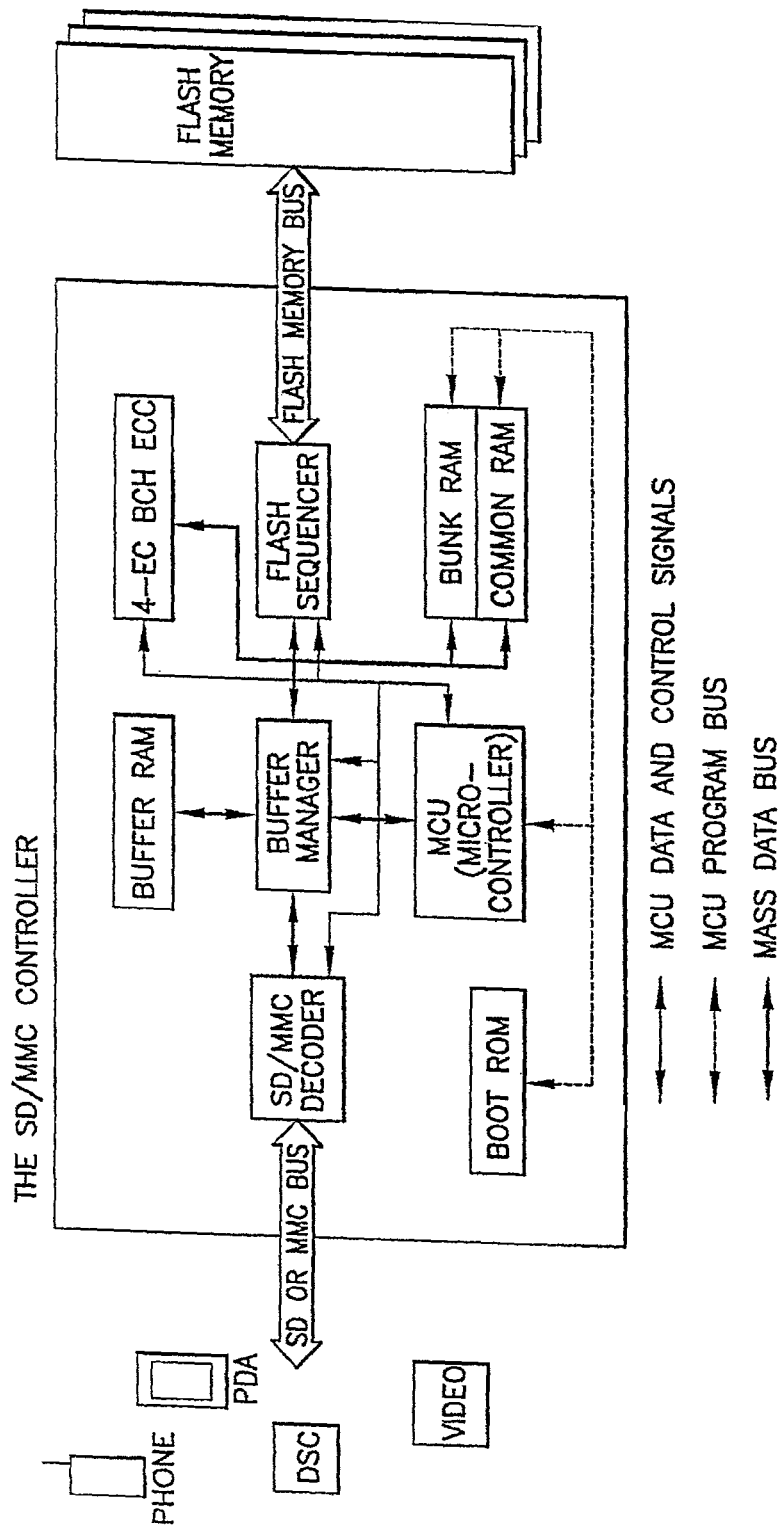
FIG. 1B reproduces FIG. 1 of Lin et al., and shows an example of an overall block diagram of a NAND flash controller architecture for a SD/MMC card.

In order that some of the host device/system resources can be used efficiently communications between the memory module/device 20 and these dynamically reserved resources occur over the virtual interface 18B. This interface can be embedded to an external memory interface 18B such as for example a mass storage memory bus shown in the eMMC of FIG. 1A as the various signal lines at the right of that figure, and shown in the SD/MMC card (NAND flash) of FIG. 1B as the SD or MMC bus. Through this virtual interface 18B the memory processing tasks or just the RAM capacity needs can be shared between the mass memory's logic and the dynamically reserved resources. This enables the mass memory module/device 20 to be designed for minimum functionality, and once in use when there is a need for more advanced functionality it can request the needed resources from the host system 10.

Figure 3:
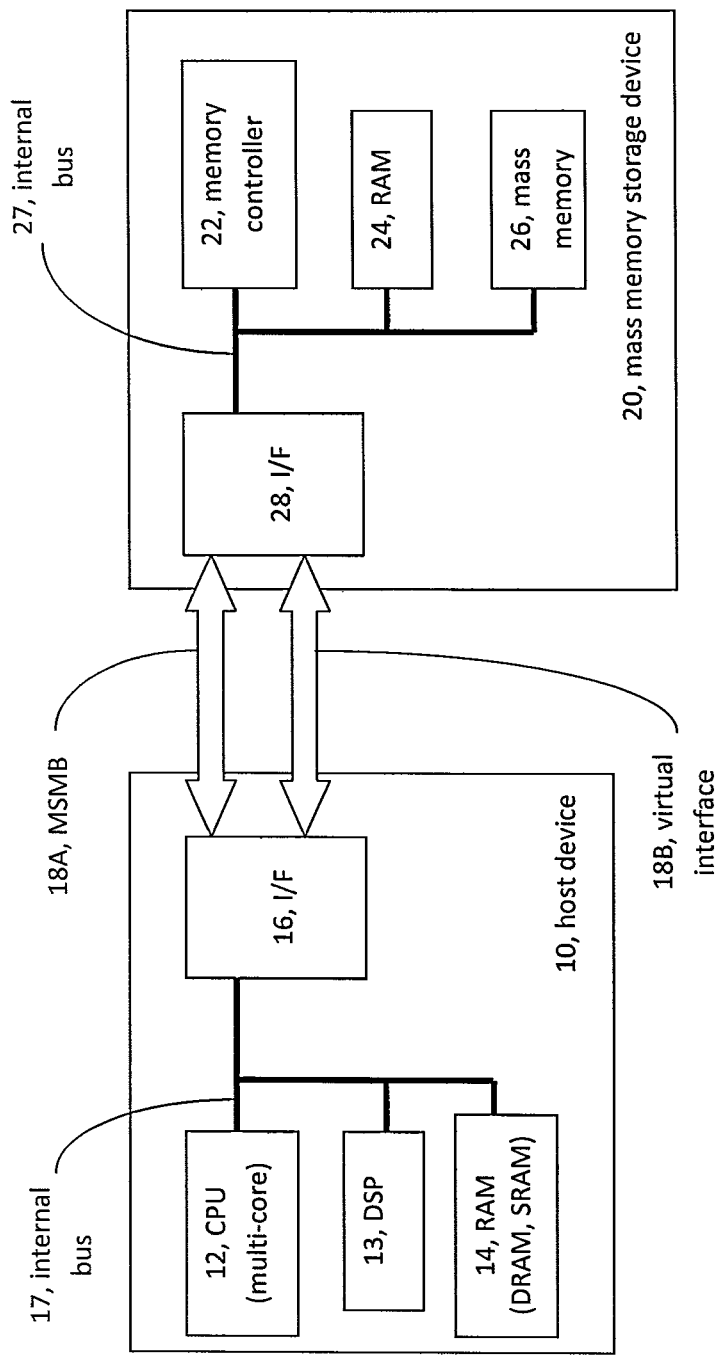
FIG. 3 is similar to FIG. 2 but is a more hardware-specific diagram showing various memories, processors and interfaces that couple the host device 10 with the mass memory device 20 according to a non-limiting embodiment of these teachings.

FIG. 3 has similar interfaces 18A, 18B as FIG. 2 but additionally shows a simplified block diagram of a host system or device 10 connected with a mass storage memory 20 via a mass storage memory bus (MSMB) 18A and the virtual interface 18B. The MSMB 18A may be compatible with any suitable mass memory interface standard such as MultiMediaCard (MMC) or Universal Flash Storage (UFS), as two non-limiting examples. The MSMB 18A may include signal lines such as those shown in FIG. 1A for an eMMC embodiment. The host device 10 includes at least one controller, such as a CPU 12 that operates in accordance with stored program instructions. The program instructions may be stored in a RAM 14 or in another memory or memories. The CPU 12 is connected with the RAM 14 and a MSMB interface (I/F) 16 via at least one internal bus 17. The MSMB interface 16 may include a memory host controller (MHC), or such a memory host controller may be associated with the CPU 12. The host device 10 may be a computer, a cellular phone, a digital camera, a gaming device or a personal digital assistant PDA, as several non-limiting examples. Note that the RAM 14 may be any read/write memory or memory device, volatile or non-volatile, such as semiconductor memory or a disk-based memory.

The mass storage memory 20 includes a microcontroller, or more simply a controller 22 that is connected via at least one internal bus 27 with a volatile RAM 24, a non-volatile mass memory 26 (e.g., a multi-gigabyte flash memory mass storage) and a MSMB interface (FF) 28. The controller 22 operates in accordance with stored program instructions. The program instructions may be stored in the RAM 24 or in a ROM or in the mass memory 26. The mass storage memory 20 may be embodied as an MMC, UFS, eMMC or a SD device, as non-limiting examples, and may be external to (plugged into) the host device 10 or installed within the host device 10. Note that the mass memory 26 may in some embodiments additionally store a file system, in which case then the RAM 24 may store file system-related metadata such as one or more data structures comprised of bit maps, file allocation table data and/or other file system-associated information.

The embodiments of the invention described in commonly-assigned U.S. patent application Ser. No. 12/455,763 provide a technique to share the RAM 14 of the host device 10 with the mass storage memory device 20. It can be assumed that the host device 10 (e.g., a mobile computer, a cellular phone, a digital camera, a gaming device, a PDA, etc.) has the capability to allocate and de-allocate the RAM 14. The allocation of the RAM 14 may be performed dynamically or it may be performed statically. The allocation of a portion of the RAM may be performed in response to a request received at the host device 10, or at the initiative of the host device 10.

For the case in which the CPU 12 is a multi-core processor, one straightforward implementation of these teachings is for the mass memory module 20 to partially or fully utilize one of the multi-core engines of the system 10 for complex mass memory operation, such as for example the wear-leveling or bad block management noted above. In this case the system DRAM (e.g., shown as RAM 14 at FIG. 2) is used for data processing storage.

Figure 4:
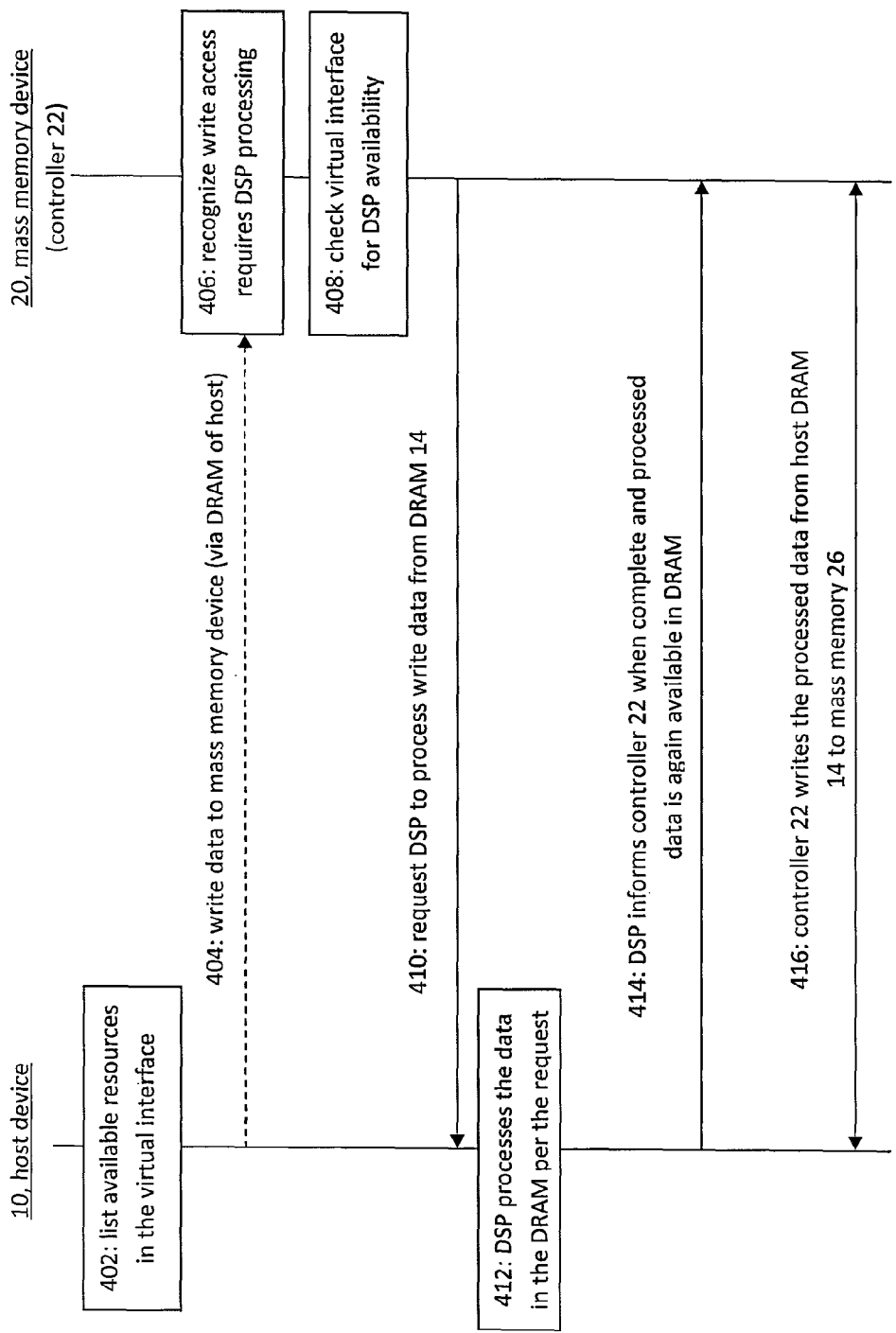
FIG. 4 is a signaling diagram illustrating another specific example for dynamically utilizing resources from the host device 10 for functions in the mass memory device 20.

FIG. 4 is a signaling diagram illustrating another specific example for dynamically utilizing resources from the host device 10 for functions in the mass memory device 20. In this example the mass memory module 20 includes memory technology which requires DSP processing instead of a simple error correcting code (ECC) engine. By example the DSP 13 in the host device 10 is shown at FIG. 3 and the ECC engine is part of the memory controller 22 in the mass memory device 20. Such an arrangement is consistent with that noted above where the mass memory device 20 is designed and manufactured to have some minimal internal functionality/processing capacity and thus lower cost and relies on these teachings to enable higher complexity operations beyond simple error corrections such as wear leveling and memory block management. In this example the DPS 13 is utilized to take advantage of its capacity to store more bits per cell, leaving a large cost efficiency in the manufacture of the mass memory device 20.

FIG. 4 begins with the host device 10 listing at block 402 its available resources on the virtual interface 18B. In another embodiment the host device 10 does not continually provide this listing as in FIG. 4 but only in response to some memory operation which involves the mass memory device 20, whether or not that operation is initiated by the mass memory device 20 or by the host device 10. In that latter case then block 402 would be conditional on 404.

In another embodiment the host device 10 can indicate resource availability information in corresponding preset registers that are in the mass memory device 20, which the memory controller 22 checks. The host device can initially store this information when initializing the mass memory device 20 itself, and dynamically update the relevant registers when initializing some memory operation such as a write operation that involves the mass memory device 20. In a still further embodiment the host device 10 can indicate the resource availability information to the mass memory device 20 with the access command itself, for example indicating with the write command to the mass memory device 20 that the DSP 13 of the host device 10 is available for this write operation. In a further non-limiting embodiment the mass memory device 20 can request the resource availability list from the host device 10, at any time (periodic) or along with some specific memory access request.

The host device 10 writes a chunk of data to the memory module 20, which as above may be a managed NAND such as a UFS. This write operation involves an interim step of writing to the host system DRAM 12 and the data residing there until the controller 22 of the mass memory 20 can process it.

Further details of the write data being resident in the DRAM 12 of the host 10 prior to final writing to the mass memory device 20 may be seen in co-owned U.S. patent application Ser. No. 13/358,806 which was referenced in the background section above, and highlights of those teachings are summarized following the description of FIG. 4. Message 402 is shown as a dashed arrow in FIG. 4 to indicate this write operation is not yet complete.

At block 406 the memory module controller 22 recognizes that this particular write access requires DSP processing, and so it checks the virtual interface 18B to see if that or some substitute is available from the host system 10. Recall that in this example the mass memory device is designed to have minimal functionality so the memory module controller 22 is incapable of fully handling this write process on its own. The virtual interface check is dynamic, based on the specific needs of this particular write operation. The DSP 13 in this instance is available, so the mass memory device 20/controller 22 sends to the DSP 13 a request that it process the write data which at this juncture is resident in the DRAM 12 of the host 10. The DSP complies with this request at 412 and at 414 the DSP 13 informs the memory module controller 22 after the DSP 13 has completed its processing that the processed data is available again in the system DRAM 14. Then finally at 416 the memory module controller 22 writes the processed data from the DRAM 14 of the host device 10 to the mass memory 26 of the mass memory device 20.

A read process according to these teachings can follow similar process steps as shown at FIG. 4 for the write process. However in this case the read process may not need an interim processing while temporarily stored in the DRAM 13 of the host 10, but there may be instances where the controller 22 of the mass memory device 20 may not be able to handle the full read process on its own if, for example, there is an error correction code that the memory module controller 22 cannot fix internally. In that case the controller 22 may check the virtual interface 18B and obtain assistance from the DSP 13 of the host device 10 even for this read process.

A similar process as FIG. 4 can be utilized to employ a security engine from the host device 10 to encrypt or decrypt data for the memory module controller 22 which may not have that capability. In additional embodiment the memory controller 22 can check the location of the device 10 by utilizing a location sensor resource from the host device 10 and make a decision about the encryption/decryption based on that location; for example, encrypt data only if located in office premises. In a more secure arrangement all encryption and decryption processes themselves are kept within specific physical confines of hardware within the host device dedicated for encryption/decryption purposes, sometimes termed a security perimeter. In this latter case the data can be freely written to and read from the mass memory device 20 in either fully encrypted or fully decrypted form with assistance of the DSP or other host device resources as detailed by example for FIG. 4, but all encryption and decryption processes themselves which arise from such reading from or writing to the memory module 20 are handled entirely within the security perimeter of the host device 10.

As mentioned above, commonly-assigned U.S. patent application Ser. No. 12/455,763 provides a model in which the mass storage memory 20 is provided with read/write access to the system (host) DRAM. Commonly assigned U.S. patent application Ser. No. 13/358,806 extends that concept to enable the mass storage memory 20 to move data within the system DRAM, either logically (by the use of pointers) or physically. The actual move could occur within the DRAM or the data could travel back and forth over the system DRAM bus between the system DRAM and a Mass Memory Host Controller DMA buffer). The Mass Memory Host Controller can be considered to function in this regard as a DMA master and thus can include its own associated DMA data buffers for this purpose.

Commonly assigned U.S. patent application No. Ser. 13/358,806 provides several specific example embodiments. In a first embodiment a separate physical address space in the system DRAM is reserved for the mass storage memory, or a logical space is reserved if the system DRAM operates in a logical address space. The mass storage memory can utilize this address space freely, and is responsible for the management functions of this address space such as allocation/de-allocation functions and other functions.

There is some source of data such as an application or a file system cache or a file cache entity (as non-limiting examples) which has data to be stored into the mass memory module. The data is moved to the transfer buffer as the transfer data by a file system/driver for subsequent delivery to the mass memory module. Optionally the data could be moved directly from its original location thereby bypassing the transfer buffer. An access list is created in the system DRAM for the application such as by an OS utility and points to the location of the data. Such an "application" (if understood in a conventional sense as a third party application) cannot itself create any access lists but instead creates read/write accesses and functions as an initiator. The access lists are created typically by some OS services/memory subsystem (e.g. some driver layer or some OS utility) based on accesses coming through the file system layer. In effect the access lists are constructed or built for the application. An initiator may be, as non-limiting examples, an application, a file system, a driver or an OS utility.

In the commonly owned application Ser. No. 13/358,806 an access may take place by the host device as follows (assuming that the host device has already correctly initiated the mass storage memory).

An initiator, such as an application program resident in the system DRAM 14 that is being executed by the CPU, has built for itself (e.g., by an OS utility) a table of accesses (access list) to the UFS memory module in the system DRAM. Assume for this example that the execution of these accesses would exhaust the resources of the UFS memory module for some period of time.

The initiator, such as the application program or the OS utility, informs the UFS host controller of the presence of the table of accesses (access list) and the host controller begins the delivery of the commands and any related data to the UFS memory module.

The same or another initiator, such as the same or a different application program, has built for itself another table of write accesses (another access list) to the UFS memory module in the system DRAM and the UFS host controller is informed of the presence of the table of accesses.

The UFS host controller transfers this set of (write) commands to the UFS memory module. Assume that the UFS memory module determines that it is not currently able to handle the data related to the write commands locally in the UFS memory module. Note in this regard that there could be, for example, a head of queue indication by the initiator related to the commands to emphasize the urgency for the execution of the write command(s), and the UFS memory module determines that it is not currently able to meet the indicated level of urgency.

Instead of receiving the data related to the write commands the UFS memory module moves the data e.g. from the transfer buffer to the reserved separate physical address space (allocated portion) of the system DRAM. The move operation and the allocated portion of the system DRAM is controlled by the UFS memory module via the UFS host controller. The UFS host controller controls the system DRAM, or the system DRAM controller, to execute the move of the data from e.g. the transfer buffer to the allocated portion as the data. The UFS host controller can be assumed to perform this operation e.g. by means of operating as DMA master (of either a dedicated UFS DMA or system DMA) directly and can bypass the host CPU.

After the physical move of the data to the allocated portion occurs the UFS memory module can respond to the original (write) command as though it had actually moved the data to the non-volatile memory (NVM), i.e., to the mass memory. As a result the second initiator can consider that the write command(s) to the mass memory have been executed and can continue its processing operations, even though the write data is currently resident as the data in the allocated portion of the system DRAM.

At some future time the UFS memory module has sufficient resources to process the write command from the second initiator. At this time it independently fetches the data from the system DRAM (from the allocated portion of the system DRAM) and stores it in the NVM mass memory. From the point of view of the initiator or the file system layer of the OS this operation is transparent, and appears as though there is physical DRAM/SRAM cache within the UFS memory module. That is, the external allocated portion of the system DRAM can function in a manner analogous to a virtual DRAM/SRAM cache of the UFS memory module.

Note that the UFS memory module 20 need not process received access commands sequentially. For example, before processing the write command from the second initiator if another write command having a higher indicated priority arrives from a third initiator, where the write data has also been stored in the allocated portion 14G, the UFS memory module 20 could process the write command from the third initiator and then process the write command from the second initiator.

In another embodiment detailed at commonly owned U.S. patent application Ser. No. 13/358,806 there need be no specific separate memory addresses reserved in the system DRAM for the mass memory module. Instead the mass memory module can have access to any (or almost any) location in the system DRAM. In this case instead of moving data physically in the system DRAM the mass memory module can control a list of memory pointers created by the host CPU. By modifying the lists of pointers (one list of pointers for host and another for the mass memory module) the mass memory module can virtually "move" data from host CPU-controlled logical memory space to space controlled by the mass memory module. Note that in this case the transfer buffer will/may still be present, however there is no need for the physical portion allocated for the mass memory module.

In all of these read-related embodiments from the commonly owned U.S. patent application Ser. No. 13/358,806, if previously cached data (logical address) is read then the read data is copied from the cache to the system memory side (host device 10, specifically the DRAM 13) and the cached data still remains also cached and will be finally written to the non-volatile memory 26 of the memory module 20 as soon as the memory controller 22 has the resources to perform the write operation.

Figure 5:
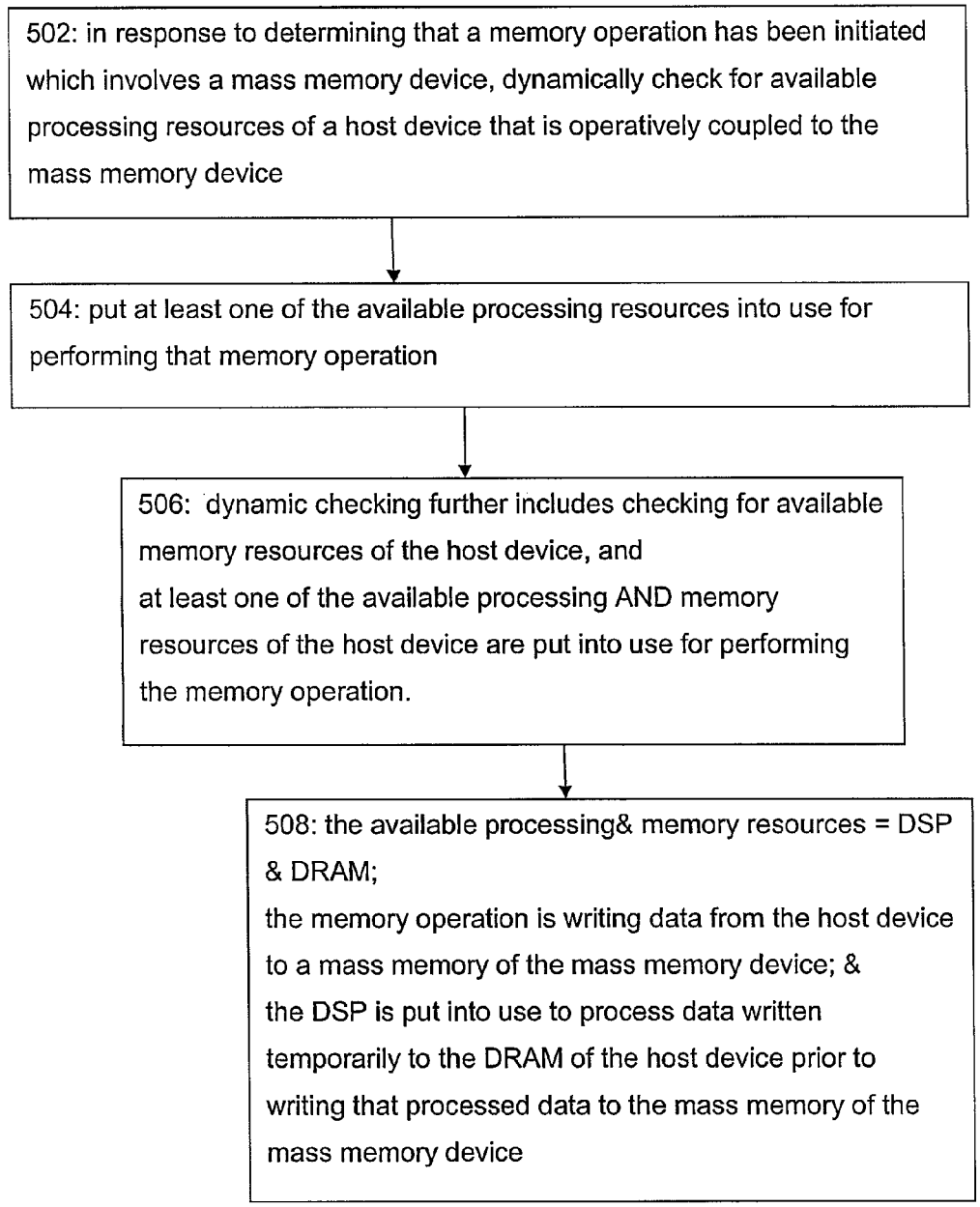
FIG. 5 is a logic flow diagram that illustrates the operation of a method, and a result of execution of computer program instructions embodied on a computer readable memory, in accordance with certain exemplary embodiments of this invention.

Certain of the above embodiments of these teachings are summarized at the process flow diagram of FIG. 5, which is from the perspective of the mass memory device 20 (more specifically, from the perspective of the memory controller 22 that is within the mass memory device 20). Alternatively the method of FIG. 5 can be performed by the memory host controller in the host device itself, either in the MSMB interface 16 or as part of the CPU 12-. At block 502, in response to determining that a memory operation has been initiated which involves a mass memory device 20, the memory controller 22 or memory host controller dynamically checks for available processing resources of a host device 10 that is operatively coupled to the mass memory device 20. Then at block 504 the memory controller 22 or memory host controller puts at least one of the available processing resources into use for performing that memory operation. As with the DSP/DRAM example above for writing data to the mass memory device 20, the utilized host processing resources (DSP) may be used for only a portion of the memory operation (processing data in the DRAM but not final writing to the mass memory 26), or in other embodiments (e.g., wear leveling, bad block management) the available processing resources of the host device may be put into use for the entire operation.

As was detailed above by various non-limiting examples, the memory controller 22 can determine that the memory operation of block 502 has been initiated via the virtual interface 18B. or by checking the preset registers that the host device 10 updates when initializing some memory operation that involves the mass memory device 20, or from the host device's access command itself, or in response to its request of the host device 10 for the availability list.

In the above examples the operative coupling of block 502 was via the physical MSMB 18A to which the virtual interface 18B was embedded. The memory controller 22 or memory host device is able to determine that a memory operation has been initiated which involves the mass memory device, as block 402 states, because it is the controller of that same mass memory device 20, so of course it will know of it initiates that operation/function directly or if some other processor or entity in the host device 10 initiated that memory operation. And in another embodiment the memory host controller of the host device 10 itself initiates the memory operation. In the above examples the initiated memory operation was a read or write operation, but also mentioned as further non-limiting examples it could be a wear leveling analysis, bad memory block management, and even data encryption or decryption (depending on where the data is being stored before or after the encryption/decryption), to name but a few.

Also in the above examples non-limiting embodiments of those available processing resources that are put into use at block 404 include any one or more of: a core engine of a multi-core CPU; a DSP; different type of sensors (like temperature-, acceleration-, movement-, location- or light sensor) and a graphics processor.

The specific DRAM example that above was detailed with respect to FIG. 4 is summarized at block 506. The dynamic checking of block 502 further checked for available memory resources of the host device, and so then at least one of the available processing resources and at least one of the available memory resources (of the host device) are put into use for performing the memory operation. Recall that in that example the available processing resource was a DSP of the host device; the available memory resources was a DRAM of the host device; the memory operation was writing data from the host device to a mass memory of the mass memory device; and the DSP was put into use for the memory operation to process data written temporarily to the DRAM of the host device prior to writing that processed data to a mass memory of the mass memory device. This is repeated in summary at block 508.

In a specific but non-limiting embodiment above the host device provided an availability list to the mass memory device over the virtual interface, wherein the virtual interface is embedded to a physical mass storage memory bus that operatively couples the host device and the mass memory device. In other specific but non-limiting embodiments the mass memory device was a MultiMediaCard MMC; an embedded MultiMediaCard eMMC; a microSD card; a solid state drive SSD; or a universal flash storage UFS device; or more generally it is a mass memory on-board the host device or a mass memory removable from the host device. Also in the above embodiments the host device was a mobile terminal (or any number of other consumer electronics, mobile or otherwise).

From the above detailed description and non-limiting examples it is clear that at least certain embodiments of these teachings provide the technical effect that the same memory module can provide different performances and functionality depending on the available system/host resources. These teachings overcome the prior limitation of fixed resources, which is how the memory controller can dynamically check what resources are available. Cost savings may be realized for an example where the mass memory device would not need to have logic defined for its maximum use case, but instead can rely on requesting resources from the host device as tasks from system are initiated and ongoing. Cost savings can be similarly obtained by reducing the size of the RAM in the mass memory module so it would no longer need to account for maximum performance in the mass memory device itself. Implementation may be more complex in that there is a resource coordination in real time between the mass memory device and the host device, but this is seen to be far overshadowed by the potential cost savings in manufacturing the mass memory devices for something less than maximum performance, and yet without foregoing that maximum performance as noted above.

We note that the various blocks shown in FIGS. 4 and 5 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

It should be further noted that the terms "connected," "coupled," "operatively coupled", or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

We claim:

1. A method comprising:
in relation to a memory operation, determining, by a memory device, available processing resources of a host device that is operatively coupled to the memory device, wherein the determining the available processing resources comprises checking one or more registers of the memory device, the one or more registers operable to store host device resource availability information that is updateable by the host device; and
putting, by the memory device, at least one available processing resource of the available processing resources into use for performing at least part of the memory operation, wherein the at least one available processing resource comprises a digital signal processor (DSP) of the host device and the putting the DSP into use for performing the at least part of the memory operation includes transmitting, by the memory device, a request to the host device for the DSP to process data written temporarily to dynamic random access memory (DRAM) of the host device prior to writing the data from the host device to a memory of the memory device.

2. The method according to claim 1, wherein the at least one available processing resource put into use for performing the at least part of the memory operation further comprises at least one of:
a core engine of a multi-core central processing unit; or
a graphics processor.

3. The method according to claim 1, further comprising:
determining, by the memory device, available memory resources of the host device; and
putting, by the memory device, at least one available memory resource of the available memory resources of the host device into use for performing the at least part of the memory operation.

4. The method according to claim 3, wherein:
the at least one available memory resource comprises the DRAM of the host device.

5. The method according to claim 1, further comprising transmitting another request, to the host device over a virtual interface between the host device and the memory device, to update the one or more registers of the memory device.

6. The method according to claim 1, wherein the determining the available processing resources further comprises checking an access command received from the host device, the access command indicating at least part of the available processing resources of the host device.

7. The method according to claim 1, wherein at least the determining is executed by a memory controller of the memory device.

8. The method according to claim 7, wherein the memory device comprises at least one of:
a memory on-board the host device;
a memory removable from the host device; or
a solid state drive (SSD).

9. The method according to claim 8, wherein the host device comprises a mobile device.

10. An apparatus, comprising:
at least one memory controller embodied in a memory device; and
an interface operable to couple the memory device to a host device;
wherein the at least one memory controller is operable to:
in relation to a memory operation, determine available processing resources of the host device by at least checking one or more registers of the memory device, the one or more registers operable to store host device resource availability information that is updateable by the host device; and
put at least one available processing resource of the available processing resources into use for performing at least part of the memory operation, wherein the at least one available processing resource comprises a digital signal processor (DSP) of the host device and the putting the DSP into use for performing the at least part of the memory operation includes transmitting a request to the host device for the DSP to process data written temporarily to dynamic random access memory (DRAM) of the host device prior to writing the data from the host device to a memory of the memory device.

11. The apparatus according to claim 10, wherein the at least one available processing resource put into use for performing the at least part of the memory operation further comprises at least one of:
   a core engine of a multi-core central processing unit; or
   a graphics processor.

12. The apparatus according to claim 10, wherein the at least one memory controller is further operable to:
   determine available memory resources of the host device; and
   put at least one available memory resource of the available memory resources of the host device into use for performing the at least part of the memory operation.

13. The apparatus according to claim 12, wherein:
   the at least one available memory resource comprises the DRAM of the host device.

14. The apparatus according to claim 10, wherein the at least one memory controller is further operable to transmit another request, to the host device over the interface, to update the one or more registers of the memory device.

15. The apparatus according to claim 10, wherein the at least one memory controller is further operable to determine the available processing resources by at least checking an access command received from the host device, the access command indicating at least part of the available processing resources of the host device.

16. The apparatus according to claim 10, wherein the memory device comprises at least one of:
   a memory on-board the host device;
   a memory removable from the host device; or
   a solid state drive (SSD).

17. The apparatus according to claim 16, wherein the host device comprises a mobile device.

18. One or more non-transitory computer readable media storing instructions that, when executed by one or more processors, cause a memory device to:
   in relation to a memory operation, determine available processing resources of a host device by at least checking one or more registers of the memory device, the one or more registers operable to store host device resource availability information that is updateable by the host device; and
   request that the host device perform at least part of the memory operation using at least one available processing resource of the available processing resources, wherein the at least one available processing resource comprises a digital signal processor (DSP) of the host device and the request is for the DSP to process data written temporarily to dynamic random access memory (DRAM) of the host device prior to writing the data from the host device to a memory of the memory device.

19. The one or more non-transitory computer readable media according to claim 18, wherein the instructions are further executable to cause the memory device to:
   determine available memory resources of the host device; and
   put at least one available memory resource of the available memory resources of the host device into use for performing the at least part of the memory operation.

20. The apparatus according to claim 10, wherein the processing performed by the DSP comprises error correction.

21. The apparatus according to claim 10, wherein the apparatus comprises the memory device.

22. The one or more non-transitory computer readable media according to claim 18, wherein the processing performed by the DSP comprises error correction.

23. The method according to claim 1, wherein the processing performed by the DSP comprises error correction.

* * * * *